United States Patent [19]
Kashi et al.

[11] Patent Number: 5,682,604
[45] Date of Patent: Oct. 28, 1997

[54] COMMUNICATIONS SYSTEM WITH PRIORITY SCHEME FOR REDUCED ACCESS DELAY

[75] Inventors: Haim Kashi, Tel-Aviv; Shmuel Katar, Tnuvot, both of Israel

[73] Assignee: Motorola, Inc., Schaumburg, Ill.

[21] Appl. No.: 543,729

[22] Filed: Oct. 16, 1995

[51] Int. Cl.⁶ ............................................. H04B 7/26
[52] U.S. Cl. ................. 455/38.2; 455/54.1; 340/825.08; 370/346; 370/449
[58] Field of Search .................... 455/38.2, 54.1; 340/505, 825.08; 370/312, 346, 449, 455, 150, 164

[56] References Cited

U.S. PATENT DOCUMENTS 5,150,114  9/1992  Johansson ........................ 370/449 X Primary Examiner—Chi H. Pham
Attorney, Agent, or Firm—James A. Coffing

[57] ABSTRACT

A communications system is described having a central station and a number of remote units arranged for communication over a common communications channel. Each remote unit has a predetermined priority parameter and each remote unit has a processor element (30), a receiver (28), a channel monitoring circuit (26) for sensing when the channel is free and a transmitter (29). The processor element is arranged to identify from received data a priority parameter of a unit currently transmitting. A comparison is performed between the priority parameter of that unit and the predetermined priority parameter, to initiate a timer function (108) in response to the channel monitoring circuit when the channel monitoring circuit indicates that the channel has become free, and to reset the timer function if the channel monitor circuit indicates that the channel has become occupied. The timer function times a selectable period which is dependent on the comparison and the timer function causes activation of the transmitter when the timer function times the selectable period. The invention is applicable to, but not limited to use in supervisory control and acquisition-of-data (SCADA) systems.

9 Claims, 5 Drawing Sheets

-PRIOR ART-

COMMUNICATIONS SYSTEM WITH PRIORITY SCHEME FOR REDUCED ACCESS DELAY

FIELD OF THE INVENTION

This invention relates to a communications system comprising at least one central station and a number of remote units arranged for communication over a common communications channel. The invention is applicable to, but not limited to use in supervisory control and acquisition-of-data (SCADA) systems.

BACKGROUND TO THE INVENTION

Communications systems exist, such as SCADA systems, in which remote terminal units (RTUs), which may be fixed or mobile radio units are interrogated or "polled" by a central unit. An example of such a system is the MOSCAD system of Motorola Inc. In SCADA systems, it is typical for a central unit to interrogate remote terminal unit (RTU's) and for the RTU's to reply with, for example, data gathered from a system under the control of the RTU's, for example an irrigation, security, power distribution or siren system.

There are two principal forms of interrogation: specific interrogation and global interrogation.

For specific interrogation, the central unit sends an interrogation code to a specific RTU and waits a constant time for a reply from this RTU, after which time the central unit interrogates the next RTU and so on.

In global interrogation, it is typical for each RTU to have a different time to sense free channel before transmitting a reply. The highest priority RTU is allocated the shortest time for reply. Thus, when the channel becomes free after the central unit has transmitted to the global interrogation request, it will be the highest priority unit that is first to access the channel, after which time the next unit waits a longer period to sense free channel before it transmits. In this manner, there is an orderly sequence for response from all the RTU's. It is not necessary for the highest priority RTU to delay before accessing the channel, but there is an inherent delay between the central unit commencing transmission and another RTU sensing that the channel is busy. This time is the channel resolution time and comprises the propagation delay on the channel as well a response time at the receiver (squelch detection time). The next unit in priority is subject to approximately the same channel resolution time and, after sensing free channel, must wait for a period at least equal to the channel resolution time before accessing the channel, to allow time for the highest priority unit to access the channel and for the occupation of the channel by that unit to be sensed. Subsequent priority units are typically programmed to delay access in the channel by multiples of a basic delay time, which is at least as long as the channel resolution time.

The arrangement described above is wasteful of channel time, because, for example, the tenth unit to respond to a global interrogation request waits 10 "slots" (ie. 10 times the basic delay time) before accessing the channel. This channel time is unused. This is particularly critical in a radio communications system, where the radio channel capacity is a valuable and scarce resource.

Where there are many RTU's in a single system, there is a large amount of overhead transmission and it is a problem that the cycle time for interrogation of all RTU's can be quite long.

There is a need for an improved method of operation of the communication systems.

SUMMARY OF THE INVENTION

According to the present invention, a communication system is provided comprising at least one central station and a number of remote units arranged for communication over a common communications channel. Each remote unit has a predetermined priority parameter (for example its identification number) and each remote unit comprises a processor element, a receiver coupled to the processor element for receiving signals from the channel and providing received data to the processor element, a channel monitoring circuit associated with the receiver for sensing when the channel is free and providing an indication to the processor element and a transmitter responsive to the processor element for transmitting on the channel. The processor element is arranged to identify from the received data a priority parameter of a unit currently transmitting, to perform a comparison between the priority parameter of that unit and the predetermined priority parameter, to initiate a timer function in response to the channel monitoring circuit (when the channel monitoring circuit indicates that the channel has become free), and to reset the timer function if the channel monitoring circuit indicates that the channel has become occupied. The timer function times a selectable period which is dependent on the comparison and causes activation of the transmitter when the timer function times the selectable period.

In accordance with another aspect of the invention, a method of operating a communications system is provided including the steps of, at a first remote unit, receiving signals from a channel, identifying from the received data a priority parameter of a second remote unit currently transmitting, performing a comparison between the priority parameter of the second remote unit and a predetermined priority parameter of the first remote unit, initiating a timer function in response to the channel monitoring circuit when the channel monitoring circuit indicates that the channel has become free and timing a selectable period which is dependent on the comparison. The timer function is reset if the channel monitoring circuit indicates that the channel has become occupied and the transmitter is activated when the timer function times the selectable period.

The invention has the advantage that the selectable period timed before activating the transmitter provides for reduced delay before transmission and therefore reduced channel wastage and a reduced polling cycle time. The selectable period can thus be selected individually for each unit lower in priority than the currently transmitting unit, to be the minimum necessary for all units to contend for access to the channel.

The invention is preferably a radio communications system and the channel is preferably a radio channel.

The step of performing the comparison preferably comprises subtracting the priority parameter of the second unit from the priority parameter of the first unit to provide a priority difference. This effectively allows the first remote unit to calculate how many other units are expected to transmit before the first unit is to be allowed access to the channel. The step of timing preferably comprises timing a selective number of predetermined units of time following sensing of free channel by the channel monitoring circuit, where the selected number of units of time is one less than the priority difference.

It is preferred that the predetermined unit of time is approximately equal to the channel resolution time of the system.

In accordance with another aspect of the invention, a remote unit of a communication system is provided as defined in the claims.

A preferred embodiment of the invention will now be described, by way of example only, with reference to the drawings.

DETAILED DESCRIPTION OF THE PREFERRED EMBODIMENT

Figure 1:
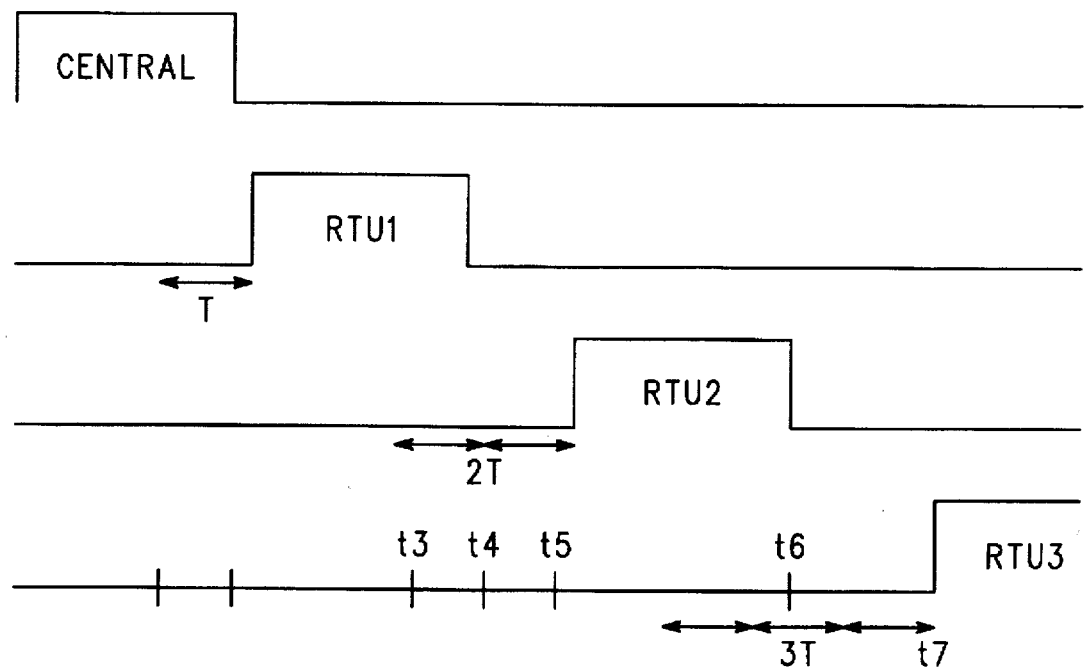
FIG. 1 shows a contention scheme known in the art.

Referring first to FIG. 1, a timing diagram of a prior art arrangement is shown. The top line of the figure shows transmission by a central unit and beneath this are transmissions of first, second and third RTU's labelled RTU1, RTU2 and RTU3. In normal operation, RTU1 senses that the central unit has ceased transmission and, being first in priority, immediately accesses the radio channel by opening its transmitter. There is a delay of time T between the central unit ceasing transmission and RTU1 opening its transmitter. Meanwhile RTU2, sensing that the channel is free, commences its timer and waits a period equal to T. Upon first initiating its timer, RTU2 senses that the channel has again become occupied by RTU1 and resets its timer. Upon the channel next becoming free at time t3, RTU2 senses at time t4 that the channel is free and commences its timer. After the period T (ie. at t5), RTU2 opens its transmitter. During this activity, RTU3 has likewise commenced a timer upon each occurrence of the channel becoming free, the period of its timer being 2T. The first opportunity for the timer of RTU3 to time out is at time t7.

As can be seen, the period between t4 and t5 and the period between t6 and t7 are wasted periods on the channel.

Figure 2:
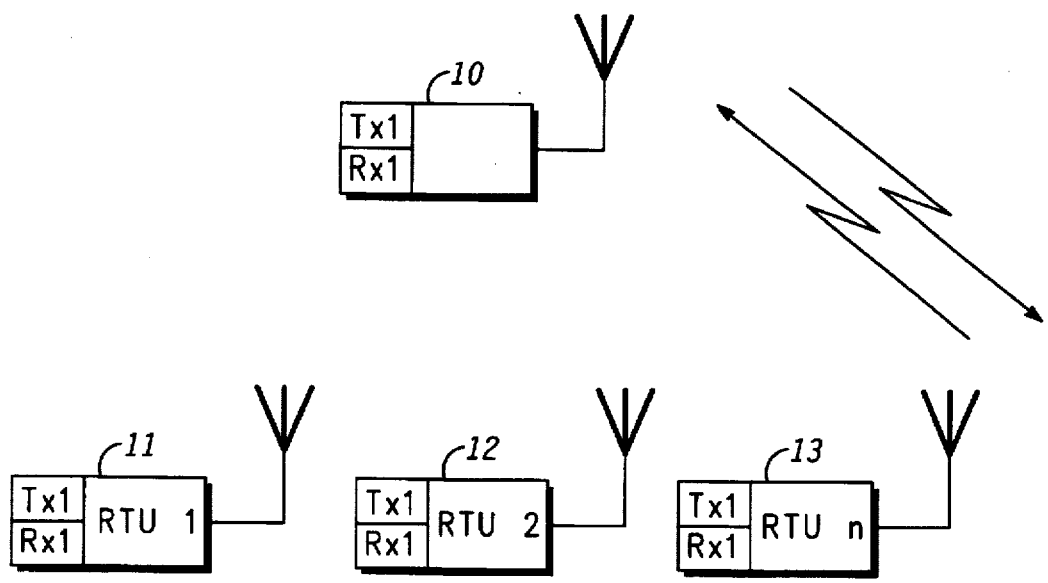
FIG. 2 shows a generalised radio communication system with a central unit and a number of remote units.

Referring now to FIG. 2, a simple radio network is shown comprising a base station 10 having a transmitter and a receiver and three RTU's 11, 12 and 13, numbered RTU1, RTU2 and RTUn. Central base station 10 transmits and receives on the same frequency (frequency 1) each of RTU's 1, 2 to n transmits and receives on frequency 1.

Figure 3:
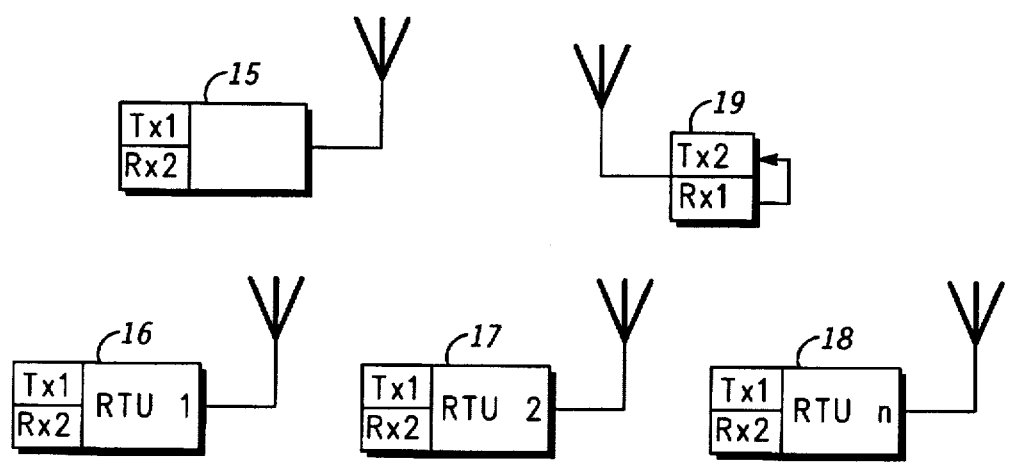
FIG. 3 shows a second arrangement of a generalised radio communication system with a central unit, a number of remote units and a repeater.

Referring now to FIG. 3, a central base station 13 is shown and RTU's 16, 17 and 18 with a repeater station 19. Base station 15 transmits on frequency 1 and receives on frequency 2. Each of RTU's 16, 17 and 18 transmits on frequency 1 and receives on frequency 2. Repeater 19 receives transmissions from base station 15 on frequency 1 and repeats these to the RTU's on frequency 2 and receives transmissions from the RTU's on frequency 1 and transmits these to the base station 15 on frequency 2.

Each of the systems of FIG. 2 and FIG. 3 has a channel resolution time which is the time between triggering transmission on one unit (remote or central) to sensing channel busy on another unit (remote or central).

Figure 4:
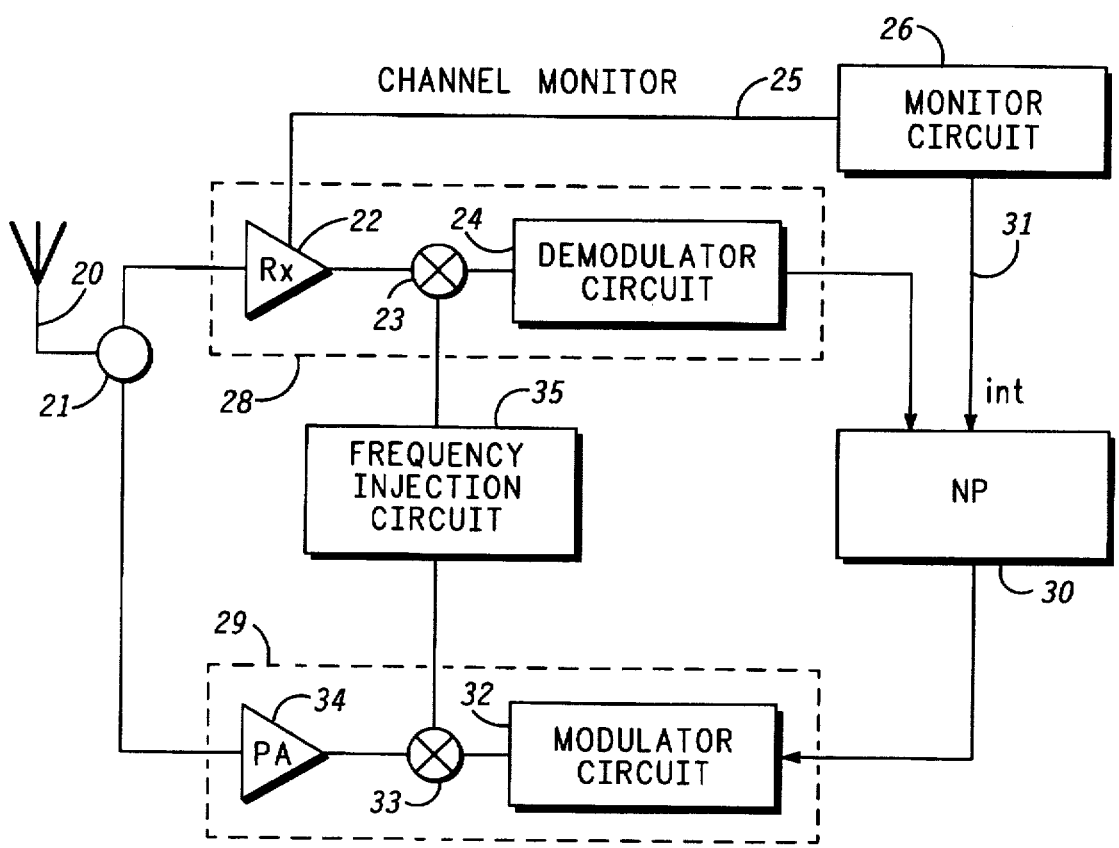
FIG. 4 shows details of a remote unit of FIG. 2 or FIG. 3 in accordance with the preferred embodiment of the invention.

Referring to FIG. 4, details of an RTU (11, 12, 13, 16, 17 or 18) is shown. The RTU comprises an antenna 20 connected to an antenna switch or circulator 21 connected in turn to a receiver part 28 comprising, for the purposes of example, an amplifier 22, a mixer 23 and a demodulator circuit 24. The receiver part may instead comprise more than one amplifier and more than one mixer. Alternatively, there may be a zero IF receiver arrangement. The amplifier 22 has a channel monitor output 25 connected to a channel monitor circuit 26 such as a squelch detection circuit. Connected to the demodulator 24 is a microprocessor 30 which also receives the signal (eg. an interrupt signal) 31 from the channel monitor circuit 26. Connected to the microprocessor 30 is a transmitter part 29 comprising, by way of example, a modulator circuit 32, a mixer 33 and a power amplifier 34. There may of course be more than one mixer or more than one amplifier. Connected to the mixers 23 and 33 is a synthesizer or other frequency injection circuit 35.

An example of a modulation scheme performed by the modulator 32 and demodulated by the demodulator 24 is FSK modulation, but it will be appreciated that other modulations can be used and indeed the circuits 24 and 32 may be replaced by software in the microprocessor 30.

In operation, signals received from the central unit (10 or 15) are received at the antenna 20 and detected by the channel monitor circuit 26. Data carried by the signals is demodulated in demodulator 24 and supplied to the microprocessor 30. The microprocessor 30 is then able to identify whether signals are intended for this RTU or for another RTU by decoding an address, identity number (ID) or priority indicator parameter contained in the received data. In a similar manner, the microprocessor 30 can determine which RTU is currently transmitting. If a response is required from the RTU in question, the microprocessor 30 provides the necessary response to the modulator circuit 32 at a time which is dependent upon the signal 31. The data supplied is amplified in amplifier 34 and transmitted through the antenna 20.

The RTU's 11, 12 and 13 or 16, 17 and 18 are provided with a numerical sequence of IDs. When one of the RTU's transmits, it includes its ID number in the start of its transmission. This ID number is used by the central unit 15 to determine the origin of an incoming message. The ID numbers need not be in the sequence 1, 2, 3 etc., but the algorithm described below is most efficient when this sequence is used.

Figure 5:
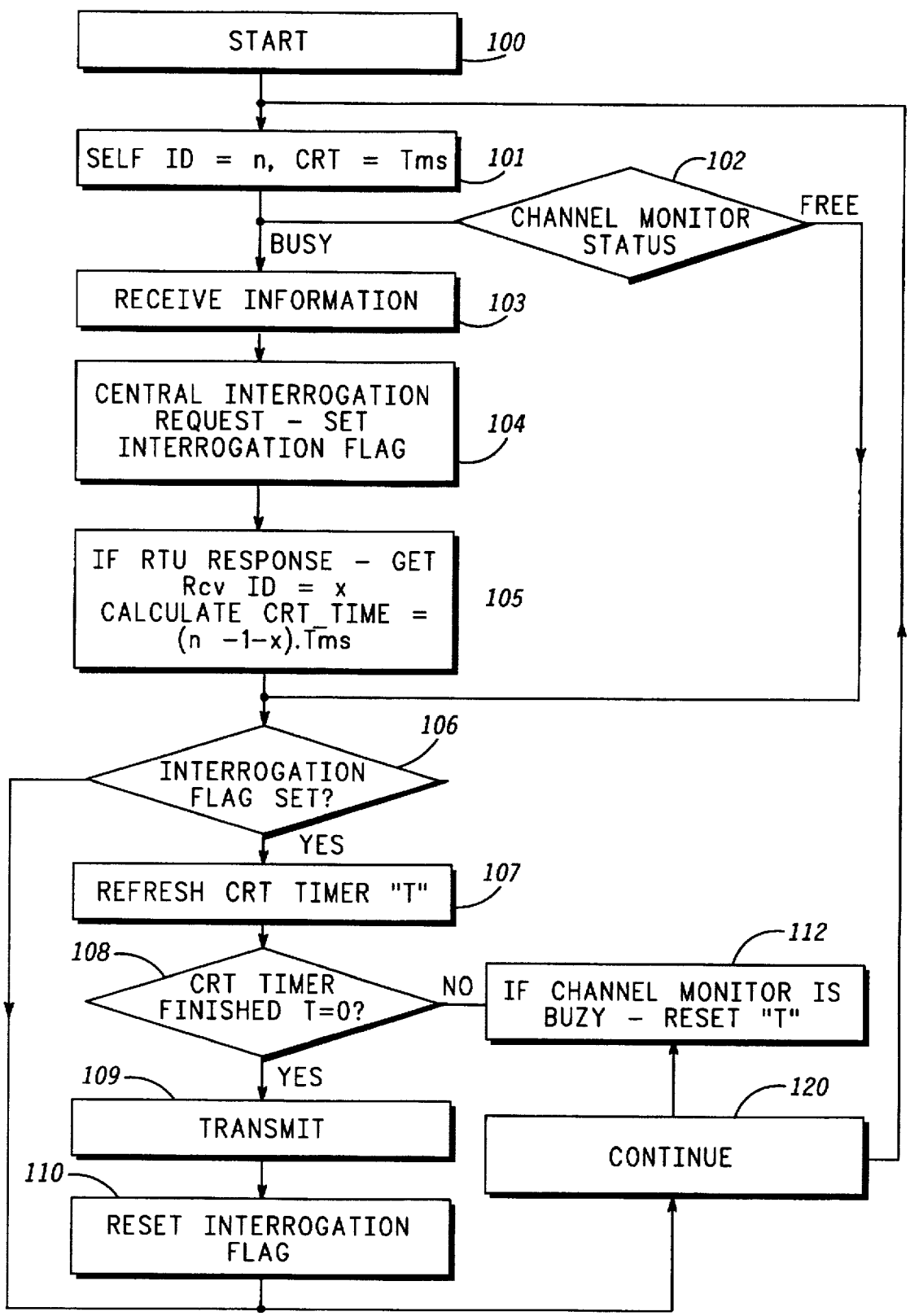
FIG. 5 is a flow diagram illustrating a software program operated by the microprocessor of the radio of FIG. 4.

The microprocessor 30 executes the program shown in FIG. 5.

Upon initialisation of the algorithm (step 100) the microprocessor 30 is provided with the ID (n) of the unit in question and a predetermined channel resolution time (CRT) set at T milliseconds.

The program operates a continuous loop starting with a test for channel monitor status (step 102). If the channel is busy, incoming data is received in step 103 and if the incoming data includes a central interrogation request, an interrogation flag is set in step 104. If, on the other hand, the incoming data is an RTU response, step 105 extracts the ID of the currently transmitting unit (Rcv ID), indicated as x. Step 105 calculates a variable, CRT_Time, as being a multiple of the channel resolution time T. This multiple is (n-1-x). Thus, a delay period is set which is 1 CRT less than the difference in priority between the currently transmitting unit and the unit in question.

If in step 106 the program determines that there is no interrogation request, the program skips to step 120 and continues by returning to step 102. If step 106 determines that there is an interrogation request, the channel resolution timer is reset when the channel monitoring circuit 26 next indicates that the channel is free. If in step 108 the CRT timer times out, the transmitter is opened at step 109 and the interrogation flag is reset in step 110, indicating that the RTU has completed its response to the interrogation.

If step 108 determines that a new interrupt is received from channel monitor circuit 26 indicating that the channel is no longer free before the timer has finished, the program jumps to step 112, resetting CRT timer and passing to step 120 for return to step 102. In this manner, if the higher priority unit accesses the channel before the RTU's timer has timed out, the RTU simply resets its timer and waits for the next occurrence of the channel becoming free.

By way of further detail, the central unit sends an interrogation code to a group of RTU's with the following parameters:

Interrogation code, from RTU no., to RTU no.

Each RTU that belongs to this group triggers a timer for free channel monitor according to the following formula:

T=Ch. Res. Time * (RTU no.—From RTU no.)

CH. Res. Time—Channel Resolution Time

RTU no.—Self RTU no.

From RTU no. Parameter from the Central interrogation word.

In the first RTU of the group (RTU no.=From RTU no.), T=0, meaning that this RTU will be the first one to transmit without delay. In the second RTU "T" is equal to one channel resolution time, meaning that if the first RTU in the group will not answer, then after monitoring the channel free for a time "T" this RTU will transmit its answer.

After each RTU transmission all the other RTU's in the group update their timers according to the following calculation:

T=Ch. Res. Time * (RTU no.-1-Rcv RTU no.)

Rcv RTU no.—The no. of the last received RTU.

Figure 6:
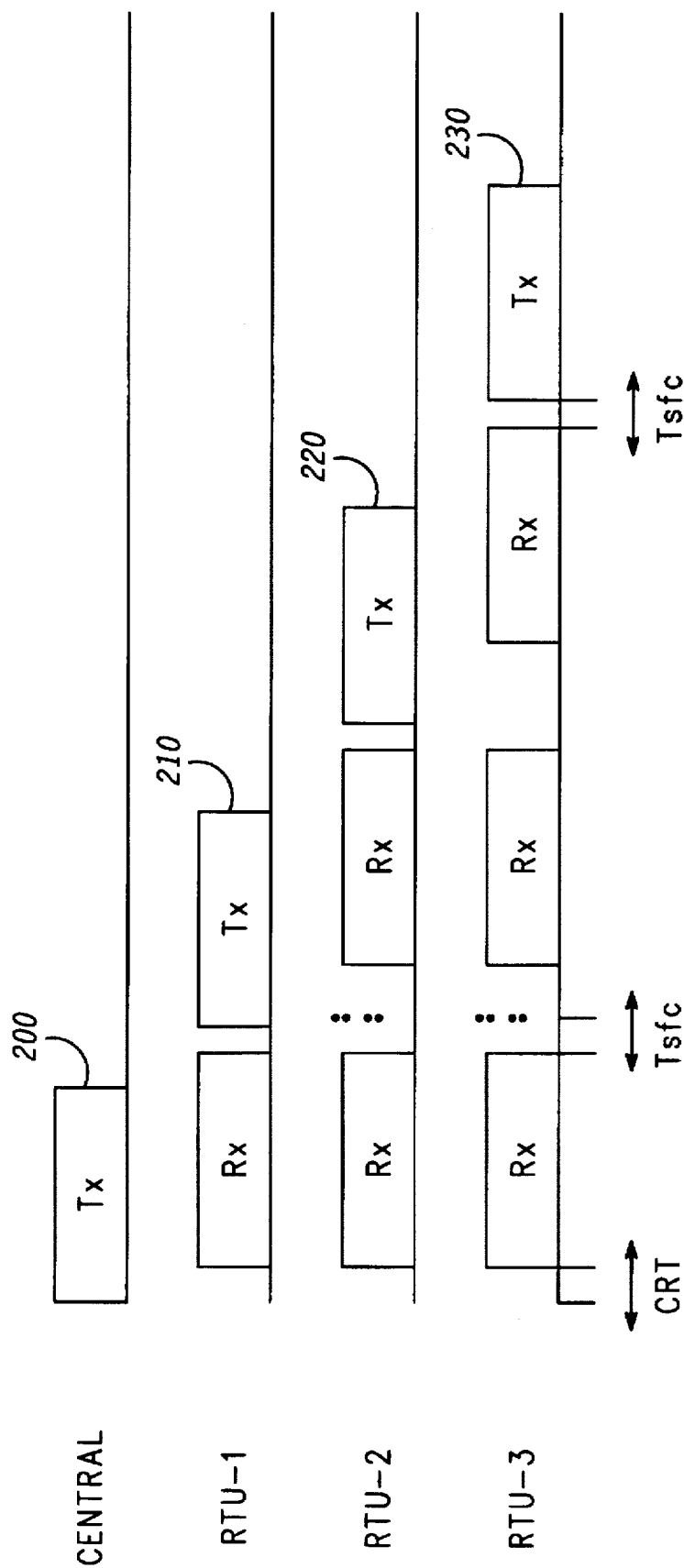
FIG. 6 and 7 are timing diagrams illustrating operation of the radio system of FIG. 2 or FIG. 3 in different circumstances.
Figure 7:
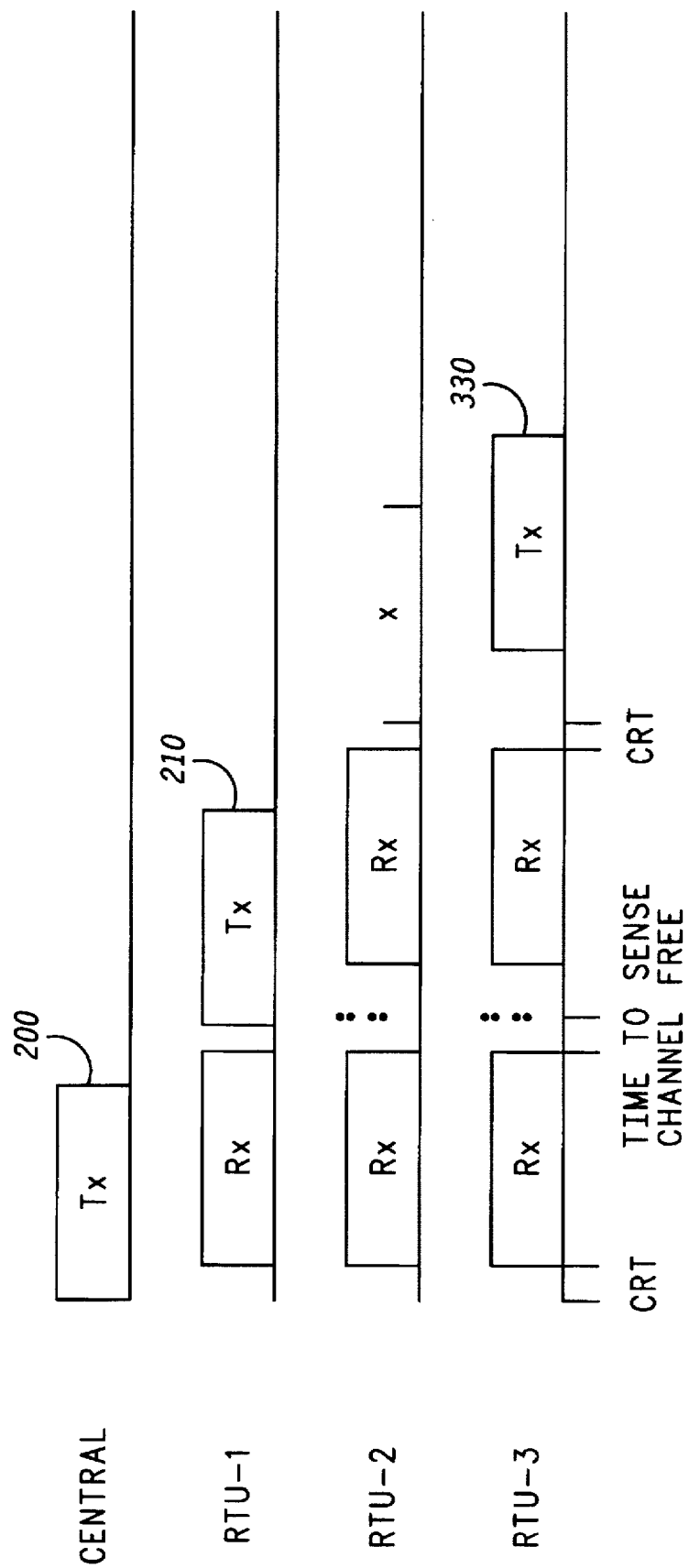

The effect of the operation of FIG. 5 is illustrated in FIGS. 6 and 7 and is as follows.

If all the RTU's in the group are operating correctly, the operation is as shown in FIG. 6 and all RTU's transmit immediately one after the other according to their serial ID numbers. In FIG. 6, the uppermost line shows the transmission from the central unit 10 or 15 and the three rows below this show reception and transmission by the RTU's 11, 12 and 13 (or 16, 17 and 18). It may be noted that the signal received at each of the RTU's is delayed with respect to the signal transmitted from the central by an mount equal to CRT. It may also be noted that the duration of the signal as received is slightly less than the duration as transmitted, because there is a period known as the "PTT" period when the transmitter sends a signal for a receiving RTU to open its receiver and commence reception. This period is included in the time CRT.

In the operation of FIG. 6, each of the RTU's, RTU1, RTU2 and RTU3 makes its transmission 210, 220 and 230 in a immediate sequence. The minimum time between a received signal ceasing and an RTU transmitting to the central unit is time Tsfc, this being the time to sense free channel. Each RTU is subject to the delay Tsfc before transmitting, but as each RTU reaches the top of the queue, transmission commences immediatly free channel is sensed by that RTU.

In the scenario illustrated in FIG. 7, RTU2 fails to transmit any response to the central unit. In this case, the response from the third RTU (response 330) occurs at a time which is 1CRT after sensing of free channel by RTUs.

In both circumstances of FIG. 6 and FIG. 7, the complete interrogation is concluded in less time than in the prior art case of FIG. 1. It should be understood that FIGS. 1, 6 and 7 are not to scale and that the actual transmission times may be substantially larger with respect to the channel resolution times and the time to sense free channel.

Instead of using a pre-assigned ID as a priority parameter, a dynamic parameter can be used as the priority parameter. For example, the priorities of the RTUs can rotate on a round-robin basis. This can be co-ordinated by the central unit in its transmission 200. Other modifications of detail can be made to the invention without departing from the scope thereof.

We claim:

1. A communications system comprising at least one central station and a number of remote units arranged for communication over a common communications channel, each remote unit having a predetermined priority parameter and each remote unit comprising:

a processor element;

a receiver coupled to the processor element for receiving signals from the channel and providing received data to the processor element;

a channel monitoring circuit associated with the receiver for sensing when the channel is free and providing an indication to the processor element;

a transmitter responsive to the processor element for transmitting on the channel;

wherein the processor element is arranged to identify from the received data a priority parameter of a unit currently transmitting, to perform a comparison between the priority parameter of that unit and the predetermined priority parameter, to initiate a timer function in response to the channel monitoring circuit when the channel monitoring circuit indicates that the channel has become free, and to reset the timer function if the channel monitor circuit indicates that the channel has become occupied, where the timer function times a selectable period which is dependent on the comparison and the timer function causes activation of the transmitter when the timer function times the selectable period.

2. A method of operating a communications system having at least one central station and a plurality of remote units arranged for communication over a common communications channel, the method comprising the steps of, at a first remote unit:

receiving signals from the channel;

identifying from the received data a priority parameter of a second remote unit currently transmitting;

performing a comparison between the priority parameter of the second remote unit and a predetermined priority parameter of the first remote unit;

initiating a timer function in response to the channel monitoring circuit when the channel monitoring circuit indicates that the channel has become free and timing a selectable period which is dependent on the comparison;

resetting the timer function if the channel monitor circuit indicates that the channel has become occupied, and activating the transmitter when the timer function times the selectable period.

3. A method according to claim 2, wherein the step of performing the comparison comprises subtracting the priority parameter of the other unit from the priority parameter of the remote unit to provide a priority difference and the step of timing comprises timing a selected number of predetermined units of time following sensing of free channel by the channel monitoring circuit, where the selected number of units timed is one less than the priority difference.

4. A method according to claim 3 wherein one predetermined unit of time is approximately equal to the channel resolution time of the system.

5. A method according to claim 4, wherein each remote unit has a unique identification number, where the identification numbers of remote units are allocated in numerical sequence and where the identification number of a remote unit is used as its priority parameter.

6. A method according to claim 3, wherein each remote unit has a unique identification number, where the identification numbers of remote units are allocated in numerical sequence and where the identification number of a remote unit is used as its priority parameter.

7. A method according to claim 2, wherein each remote unit has a unique identification number, where the identification numbers of remote units are allocated in numerical sequence and where the identification number of a remote unit is used as its priority parameter.

8. A remote unit of a communications system having a number of remote units arranged for communication over a common communications channel, the remote unit having a predetermined priority parameter and comprising:

a processor element;

a receiver coupled to the processor element for receiving signals from the channel and providing received data to the processor element;

a channel monitoring circuit associated with the receiver for sensing when the channel is free and providing an indication to the processor element;

a transmitter responsive to the processor element for transmitting on the channel;

wherein the processor element is arranged to identify from the received data a priority parameter of a unit currently transmitting, to perform a comparison between the priority parameter of that unit and the predetermined priority parameter, to initiate a timer function in response to the channel monitoring circuit when the channel monitoring circuit indicates that the channel has become free, and to reset the timer function if the channel monitor circuit indicates that the channel has become occupied, where the timer function times a selectable period which is dependent on the comparison and the timer function causes activation of the transmitter when the timer function times the selectable period.

9. A radio communications system comprising at least one central station and a number of remote units arranged for communication over a common communications channel, each remote unit having a predetermined parameter and comprising:

a receiver having a channel monitoring circuit for sensing when the channel is free;

a demodulator and decoder circuit for demodulating signals received and decoding and identifying a parameter of a remote unit transmitting on the channel at a given time;

a counting arrangement for subtracting the parameter of the currently transmitting unit from the predetermined parameter of the unit in question to give a delay number;

a timer arrangement for waiting that number of delay units less one following sensing of free channel by the channel monitoring circuit;

a reset arrangement for resetting the timer arrangement when the channel monitoring circuit senses that the channel is no longer free before the selected number of units are timed and a transmitter for transmitting on the channel when the timer arrangement counts to the selectable number of delay units.

* * * * *